Patented June 25, 1946

UNITED STATES PATENT OFFICE 2,402,647

MANUFACTURE OF SULPHURIC ESTER SALTS OF PHENOLS

Hans Z. Lecher, Plainfield, Mario Scalera, Somerville, and Elizabeth M. Hardy, Bound Brook, N. J., assignors to American Cyanamid Company, New York, N. Y., a corporation of Maine No Drawing. Application January 17, 1944, Serial No. 518,585

7 Claims. (Cl. 260—369)

This invention relates to an improved process of preparing sulphuric ester salts of phenols free from leuco quinonoid groupings, and more particularly the invention deals with the use of sulphur trioxide compounds of a certain class of tertiary amines in aqueous alkaline medium. The present invention does not include the preparation of sulphuric ester salts of leuco quinones, which is the subject matter of the copending application of Lecher, Scalera and Lester, Serial No. 518,584, filed January 17, 1944.

In the past some phenols have been esterified with sulphur trioxide addition products of certain aromatic tertiary amines, such as pyridine. In general, it has been considered necessary to carry out the reaction in an anhydrous medium which greatly complicated the process, necessitating extensive equipment for drying and recovering the solvent and for drying the phenol. It was considered that an aqueous alkaline medium would not be satisfactory because the pyridium compound actually has the pyridine ring opened by strong aqueous alkali and no processes using a sulphur trioxide pyridine addition product in aqueous medium have been found to give results which are commercially satisfactory.

According to the present invention we have found that sulphur trioxide derivatives of strongly basic tertiary amines, particularly non-aromatic tertiary amines, are capable of reacting with phenols free from leuco quinonoid groupings in aqueous alkaline medium with such speed that no serious hydrolysis results, since these compounds are materially more stable to hydroylsis in alkaline medium than are the corresponding compounds of pyridine. A short agitation of the phenol with the addition product of sulphur trioxide and the strong tertiary amines in aqueous alkaline medium at room temperature, or slightly above, is all that is necessary to produce the sulphuric ester salt. The ester salt is readily formed, and in many cases the yields are substantially quantitative. In most cases it is a relatively simple matter to isolate the ester from the solution, for example by salting out.

The present invention is not limited to particular tertiary amines, but it is necessary for practically useful results that the amines should have a dissociation constant of at least $1 \times 10^{-7}$ at 25° C. Examples of such amines are simple tertiary alkyl amines, such as trimethylamine, triethylamine, the tripropylamines, the tributylamines; unsaturated straight chain amines, such as triallylamine; aralkylamines, such as dimethyl benzylamine and diethyl benzylamine; alicyclic amines, such as cyclohexyl dimethylamine, cyclohexyl diethylamine, cyclopentyl dimethyl amine; and heterocyclic amines of aliphatic character such as N-methyl morpholine, N-ethyl morpholine, and N-ethyl piperidine.

The sulphur trioxide addition products with which the present invention is concerned are now generally regarded as internal salts of trisubstituted sulphamic acids and are represented by the following formula:

$$\overset{+}{R_3N}-\overset{-}{SO_3}$$

Some of these products are known and others are themselves new compounds. They may be prepared in a number of ways which are in general known, such as the action of sulphur trioxide or agents capable of generating sulphur trioxide on tertiary bases. They are quite different in nature from the corresponding addition products of aromatic amines such as dimethylaniline or pyridine. They show much greater stability to water from which some of them may be recrystallized and they resist aqueous alkali sufficiently to permit ready reaction with phenols.

The stability of the strong tertiary amine-sulphur trioxide addition products is all the more surprising in view of the fact that they are extremely reactive in alkaline medium, reacting rapidly with phenols in alkaline aqueous medium. This anomalous behavior was unpredictable, as normally one would expect that stability toward hydrolysis would be associated with low reactivity. The reason for this surprising behavior is not fully known, but it seems probably that at least one factor is the strength of the base since markedly poorer results are obtained when bases are used having dissociation constants less than $1 \times 10^{-7}$. While all of the sulphur trioxide addition products of the present invention are useful, they differ to some extent among themselves, both as to stability and as to solubility. Thus, for example, the sulphur trioxide compound of N-ethyl morpholine is considerably more stable than that of N-methyl morpholine. The solubility also varies, and last but not least, the rate of esterification is not constant and will depend on the amine compound chosen as well as the phenol. With compounds showing high stability against hydrolysis and rapid reaction rate with the phenols good results may be obtained with only a small excess of the amine compound. Compounds having higher rates of hydrolysis as compared with esterification rate require larger excesses. The choice of the compound to be used depends not only on the excess required, but also on its cost.

It is an advantage of the present invention that in general the process works well at room temperature or slightly above. High temperatures which were necessary in the past can be avoided. The optimum temperature will vary somewhat with the phenol and with the particular amine-sulphur trioxide compound used.

A further advantage of the present invention is that in most cases the amine which is produced by the reaction may be recovered. The reaction is normally considered to proceed in accordance with the following equation:

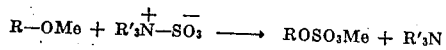

$$R\text{—}OMe + R'_3N\text{—}SO_3 \longrightarrow ROSO_3Me + R'_3N$$

The regenerated amine may be recovered in various ways. Where it is very volatile, as trimethylamine, the crude reaction product may be heated and the amine volatilized. With less volatile amines it is preferable to separate the ester salt by salting out and recover the amine later from the mother liquor, either by stripping or salting out with caustic alkali. The relatively slight excess of the amine used is an important factor influencing the cost of the process as the recovering of large amounts of amine used as solvent in the old processes was a large factor in increased costs.

While the use of water as an esterification medium is the most important feature of the present invention, it is not necessary to use water alone, and other solvents which are miscible with the aqueous alkaline solution and which are compatible with the other reactants may be added to the aqueous medium. Examples of such solvents are lower aliphatic alcohols, acetone, pyridine, polyalkylene oxides and their ethers. The possibility of using such mixed solvents adds a desirable flexibility to the process in cases where the phenolates may be only sparingly soluble in water.

The phenols free from leuco quinonoid groupings comprise all those phenols that are not obtainable by a simple reduction of a quinone. Examples of such compounds are phenol, the cresols, xylenols, thymol, carvacrol, resorcinol and its homologues, phloroglucinol, the naphthols (alpha and beta), hydroxy anthracenes, hydroxy anthraquinones, hydroxy fluorenes, hydroxy phenanthrenes. Heterocyclic hydroxy compounds of phenolic character are also included, such as, e. g., indoxyl, 3-hydroxy thionaphthene, hydroxy carbazoles, hydroxy naphthocarbazoles, hydroxy pyridines and hydroxy quinolines. Various substitution products of such phenols may also be converted into sulphuric acid esters, such as, e. g., guaiacol, orcinol, eugenol and isoeugenol, p-chlorophenol, 1-bromo-2-naphthol, phenol and naphthol sulfonic acids and carboxylic acids, etc.

The invention will be described in greater detail in conjunction with the following examples, the parts being by weight.

*Example 1*

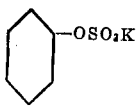

Into a solution of 350 parts of water, 90 parts of caustic potash and 276 parts of potassium carbonate were introduced 151 parts of phenol. The slurry was warmed until clear and cooled to 10° C. To the resulting white slurry there was added 390 parts of the N-ethyl morpholine sulphur trioxide addition product (prepared by the action of sulphur trioxide on N-ethyl morpholine in chloroform; white crystals, M. P. 150° C.). The temperature was maintained at 10–15° C. during the addition, and for four hours longer.

At the end of this period the slurry was treated with gaseous carbon dioxide until it was no longer alkaline to phenolphthalein. The slurry was then boiled with 2,000 parts of absolute ethanol, filtered hot to remove inorganic salts. From the cooled filtrate the reaction product separated in the form of glistening plates, in a high state of purity.

*Example 2*

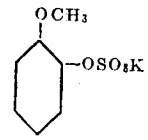

A solution of 800 parts of water, 166 parts of potassium carbonate, 56 parts of caustic potash and 124 parts of guaicol was prepared by heating the ingredients together until a clear liquid resulted. On cooling to 35° C. a thin slurry was obtained. To this slurry there were added 167 parts of the trimethyl-amine-sulphur trioxide addition product, and agitation was continued at 30–35° C. for five hours.

The slurry was neutralized to phenolphthalein by means of $CO_2$, treated with an equal volume of alcohol and filtered. From the filtrate the desired product could be obtained by evaporation to dryness.

To obtain it in a high state of purity the aqueous alcoholic solution was evaporated to a syrup, 1,500 parts of absolute ethanol were added; it was heated to the boiling temperature and filtered. On cooling the desired product separated in good yield and in a high state of purity.

*Example 3*

To 1,500 parts of water there were added 56 parts of caustic potash, 166 parts of potassium carbonate, and 144 parts of beta-naphthol. A clear solution was obtained by warming. This was cooled to room temperature and treated with 167 parts of the trimethylamine-sulphur trioxide addition product. The resulting slurry was agitated for five hours at room temperature, then filtered and washed with a very dilute solution of potassium chloride and potassium hydroxide.

The product was thus obtained in quantitative yield and good purity. One recrystallization from water gave a material entirely free of inorganic salts and pure enough for analyis.

*Example 4*

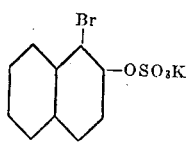

44 parts of 1-bromo-2-naphthol were dissolved in 600 parts of water containing 11 parts of caustic potash and 41 parts of potassium carbonate. To the clear solution there were added 59 parts of the addition product of N-ethyl morpholine and sulphur trioxide, and the mixture was agitated for three hours at room temperature.

The slurry was filtered, washed with cold water and dried in a vacuum dryer. The product, obtained in excellent yield in very pure state, melted at 227–230° C.

Example 5

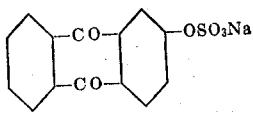

224 parts of 2-hydroxy anthraquinone were dissolved in 40 parts of caustic soda and 2,500 parts of water. To the clear red solution there were added 127 parts of soda ash and 167 parts of the trimethylamine-sulphur trioxide addition product.

After stirring for several hours at room temperature, the solution was made neutral to phenolphthalein with carbon dioxide and filtered. Sufficient sodium chloride was added to the warm solution to make the concentration 10%; it was then cooled, and the crystalline product isolated by filtration. The white, crystalline material is readily soluble in water, acid or alkaline. On heating in dilute mineral acid solution, 2-hydroxy anthraquinone is immediately liberated. The product may be recrystallized from alcohol.

We claim:

1. A process for the manufacture of water soluble sulphuric ester salts of phenols selected from the group consisting of monohydric phenols and polyhydric phenols, the hydroxyl groups of the latter situated in the same ring system, being separated from each other by the shortest route by an uneven number of nuclear carbon atoms, which comprises reacting the phenols in aqueous alkaline medium with sulphur trioxide compounds of tertiary amines having a dissociation constant of at least $1 \times 10^{-7}$ at 25° C.

2. A process for the manufacture of water soluble sulphuric ester salts of phenols selected from the group consisting of monohydric phenols and polyhydric phenols, the hydroxyl groups of the latter situated in the same ring system, being separated from each other by the shortest route by an uneven number of nuclear carbon atoms, which comprises reacting the phenols in aqueous alkaline medium with a sulfur trioxide compound of a trialkylamine.

3. A process for the manufacture of water soluble sulphuric ester salts of phenols selected from the group consisting of monohydric phenols and polyhydric phenols, the hydroxyl groups of the latter situated in the same ring system, being separated from each other by the shortest route by an uneven number of nuclear carbon atoms, which comprises reacting the phenols in aqueous alkaline medium with the sulphur trioxide compound of trimethylamine.

4. A process for the manufacture of water soluble sulphuric ester salts of phenols selected from the group consisting of monohydric phenols and polyhydric phenols, the hydroxyl groups of the latter situated in the same ring system, being separated from each other by the shortest route by an uneven number of nuclear carbon atoms, which comprises reacting the phenols in aqueous alkaline medium with the sulphur trioxide compound of N-ethyl morpholine.

5. A method according to claim 1 in which the phenol is a naphthol.

6. A method according to claim 1 in which the phenol is phenol.

7. A method according to claim 1 in which the phenol is beta hydroxy anthraquinone.

HANS Z. LECHER.
MARIO SCALERA.
ELIZABETH M. HARDY.